US012546951B2

(12) United States Patent
Nguyen et al.

(10) Patent No.: US 12,546,951 B2
(45) Date of Patent: *Feb. 10, 2026

(54) SINGLE PORT BLINDMATE FOR FIBER OPTIC CONNECTORS

(71) Applicant: US Conec Ltd., Hickory, NC (US)

(72) Inventors: Hiep V. Nguyen, Fort Mill, SC (US); Jason Higley, Hickory, NC (US); Darrell R. Childers, Hickory, NC (US); Michael E. Hughes, Hickory, NC (US)

(73) Assignee: US Conec Ltd., Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/608,041

(22) Filed: Mar. 18, 2024

(65) Prior Publication Data

US 2024/0219650 A1    Jul. 4, 2024

Related U.S. Application Data

(60) Continuation of application No. 17/898,252, filed on Aug. 29, 2022, now Pat. No. 11,940,657, which is a division of application No. 16/773,010, filed on Jan. 27, 2020, now Pat. No. 11,428,875.

(60) Provisional application No. 62/796,960, filed on Jan. 25, 2019.

(51) Int. Cl.
*G02B 6/38* (2006.01)
(52) U.S. Cl.
CPC .......... *G02B 6/3825* (2013.01); *G02B 6/3897* (2013.01)

(58) Field of Classification Search
CPC ............................ G02B 6/3897; G02B 6/3825
See application file for complete search history.

(56) References Cited

U.S. PATENT DOCUMENTS

| 5,796,896 | A | 8/1998 | Lee |
| 6,406,192 | B1 | 6/2002 | Chen et al. |
| 6,461,053 | B1 | 10/2002 | Mayercik et al. |
| 6,592,268 | B2 | 7/2003 | Chen et al. |
| 6,604,861 | B2 | 8/2003 | Chen et al. |
| 6,755,574 | B2 | 6/2004 | Fujiwara et al. |
| 6,769,814 | B2 | 8/2004 | Kiani et al. |
| 6,932,514 | B2 | 8/2005 | Anderson et al. |
| 7,073,953 | B2 | 7/2006 | Roth et al. |

(Continued)

FOREIGN PATENT DOCUMENTS

| JP | 2020046495 A | 3/2020 |
| WO | 2004008578 A1 | 1/2004 |

*Primary Examiner* — Michelle R Connelly
(74) *Attorney, Agent, or Firm* — Michael L. Leetzow PLLC; Shubhrangshu Sengupta

(57) ABSTRACT

A fiber optic connector assembly is mated with a bracket on a printed circuit board at one end and inserted into a backplane adapter that is adjacent a backplane. In particular a spring push in slidingly attached to the bracket and also to the housing of the fiber optic connector assembly. The housing of the fiber optic connector assembly insertable into the backplane adapter using passive alignment features. A fiber optic ferrule in the fiber optic connector assembly is biased in a forward direction by a spring in the spring push. At the same time the spring allows for movement of the spring push within the housing to allow for movement of the printed circuit board relative to the backplane adapter.

20 Claims, 15 Drawing Sheets

(56) References Cited

U.S. PATENT DOCUMENTS

| | | | |
|---|---|---|---|
| 7,422,376 B2 | 9/2008 | Chen et al. | |
| 9,568,692 B2 | 2/2017 | Annis et al. | |
| 9,720,188 B2 * | 8/2017 | Barwicz | G02B 6/3897 |
| 9,726,830 B1 | 8/2017 | Gniadek | |
| 10,078,187 B2 | 9/2018 | Gniadek | |
| 10,107,972 B1 | 10/2018 | Gniadek | |
| 10,371,903 B1 | 8/2019 | Nguyen et al. | |
| 10,754,103 B2 | 8/2020 | Leigh et al. | |
| 11,940,657 B2 * | 3/2024 | Nguyen | G02B 6/3825 |
| 2005/0018973 A1 | 1/2005 | Loder et al. | |
| 2005/0163429 A1 | 7/2005 | Grzegorzewska et al. | |
| 2005/0281509 A1 | 12/2005 | Cox et al. | |
| 2006/0239619 A1 * | 10/2006 | Luther | G02B 6/3821 |
| | | | 385/59 |
| 2007/0154160 A1 | 7/2007 | Tourne et al. | |
| 2012/0141070 A1 | 6/2012 | Sabo | |
| 2014/0044395 A1 * | 2/2014 | Waldron | G02B 6/38 |
| | | | 385/60 |
| 2018/0314015 A1 | 11/2018 | Otomitsu | |
| 2019/0113693 A1 | 4/2019 | Yang | |
| 2020/0057206 A1 | 2/2020 | Gniadek | |

* cited by examiner

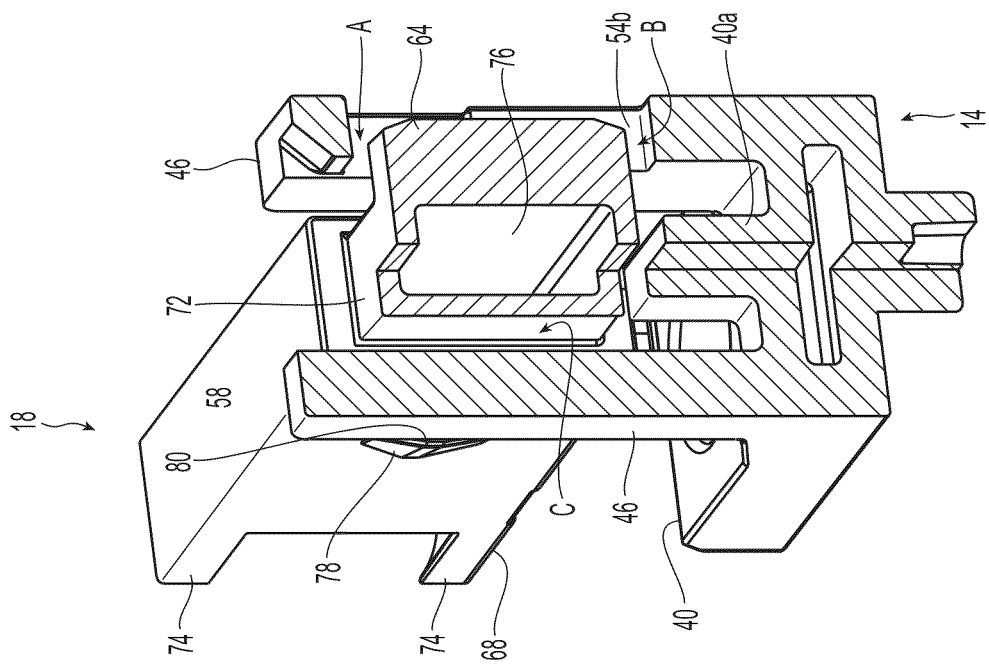
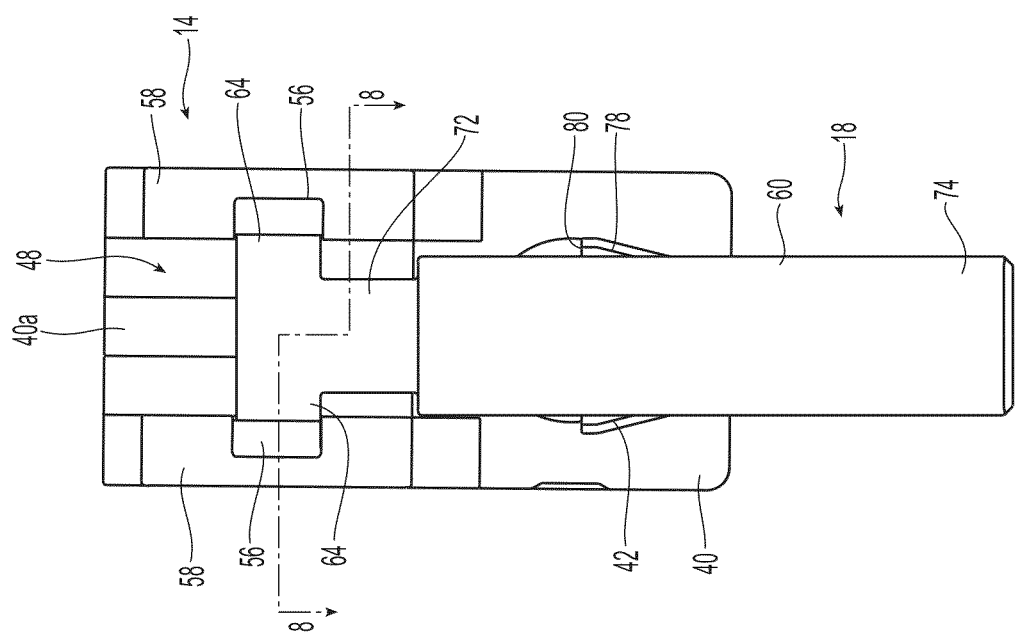

SINGLE PORT BLINDMATE FOR FIBER OPTIC CONNECTORS

REFERENCE TO RELATED CASE

This application claims priority under 35 U.S.C. § 119 (e) to provisional application No. 62/796,960 filed on Jan. 25, 2019, and under 35 U.S.C. § 120 to U.S. patent application Ser. No. 16/773,010 filed on Jan. 27, 2020, and to U.S. patent application Ser. No. 17/898,252, the contents of which are hereby incorporated by reference in their entirety.

BACKGROUND OF THE INVENTION

Fiber optic connectors are used alongside electrical and other connectors on a printed circuit board (PCB) adjacent a back plane of a server or computer system. This PCB is often referred to as a "daughter card" or simply a "card." Fiber optic connectors on this card provide a pathway for the optical signals to travel to and from the outside world by mating at the backplane.

This mating is possible using ganged optical connectors that are connected to a ganging adapter/carrier. This requires an alignment of the ganging adapter with the fiber optic connectors to an adapter on the backplane by using latches. This alignment must occur before the optical mating. In order to have low stresses on the card, it is desirable to move the ferrule mating force from the card to the backplane. This process of stress relieving the card is referred to as "handshaking." Conventional designs require latches on the sides of the ganging adapter, which makes the adapter bulkier. Currently there are 6-port configurations available, i.e., six fiber optic connectors are ganged together and brought to the backplane.

Further, the ganged adapter is usually directly mounted to the daughter card, which already has bulky components, including heatsinks and other electronics. For proper handshaking, the ganged adapter must be properly mounted to the daughter card. Typically, latch based handshaking takes up space and increases the footprint on the backplane, where space is limited. Further, alignment for the latches for mating with the backplane adapter has to be precise. The ability to align all of these bulky components is limited at best.

There are times when only single port connections are needed, which cannot be accomplished efficiently using ganged adapters. Likewise, if a new application with 7 ports is needed (rather than the conventional 6), the remaining empty ports (5) of a second ganged adapter are wasted (along with the space), unless a complete redesign and retooling of the adapter interface is carried out. Naturally, this is less than optimal. While it may be possible to eliminated the handshaking components, this leads to additional stresses on the card with the fiber optic connectors are directly attached.

In order to prevent such issues and to better ensure a better mating experience, a new fiber optic connector assembly, card bracket and backplane adapter have been designed to eliminate these problems and allows for simple connection of the fiber optic connectors without the handshaking and stress on the card.

SUMMARY OF THE INVENTION

The present invention is directed to a fiber optic connector assembly that includes a bracket securable to a printed circuit board, the bracket having latch arms defining an opening therebetween, a spring push operably connected to at least a portion of the bracket and disposed within a portion of the opening, and a housing having a slot for slidably receiving and slidably retaining the spring push In some embodiments, the spring push is moveable in at least two orthogonal directions in the brackets.

In some embodiments, the assembly also includes a fiber optic ferrule disposed in at least a portion of the housing.

In another aspect, the invention is directed to a backplane adapter for a pair of fiber optic connectors that includes a main body with an outer stop surface configured to engage a stop portion of a fiber optic connector housing, and an alignment passageway within the main body of the backplane adapter to receive an alignment feature on the fiber optic connector housing, the alignment passageway having a length that is longer than a length of the alignment feature, the stop portion of the fiber optic connector housing engaging the outer stop surface before a front end of the alignment features engages an internal portion of the backplane adapter.

In some embodiments, the backplane adapter also includes at least one step alignment passageway to receive at least one alignment step on the fiber optic connector housing.

In other embodiments, the backplane adapter also includes at least one outer connector stop surface in an opening in the backplane adapter, the at least one outer connector stop facing a direction opposite that of the outer stop surface.

In yet another aspect, the invention is directed to a fiber optic connector assembly that includes a bracket secured to a printed circuit board, a spring push operatively connected to the bracket; and a housing having an opening therein to receive at least a portion of the spring push, the spring push movably retained within the housing opening.

In some embodiments, the spring push is movable from a first position within the housing to a second position when a force is exerted on the printed circuit board.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

BRIEF DESCRIPTION OF THE DRAWINGS

FIG. 7 a top plan view of the spring push of FIG. 4 inserted into the bracket of FIG. 4;

FIG. 8 is cross section through the bracket and the spring push along the line 8-8 in FIG. 7;

DETAILED DESCRIPTION OF THE INVENTION

Figure 1:
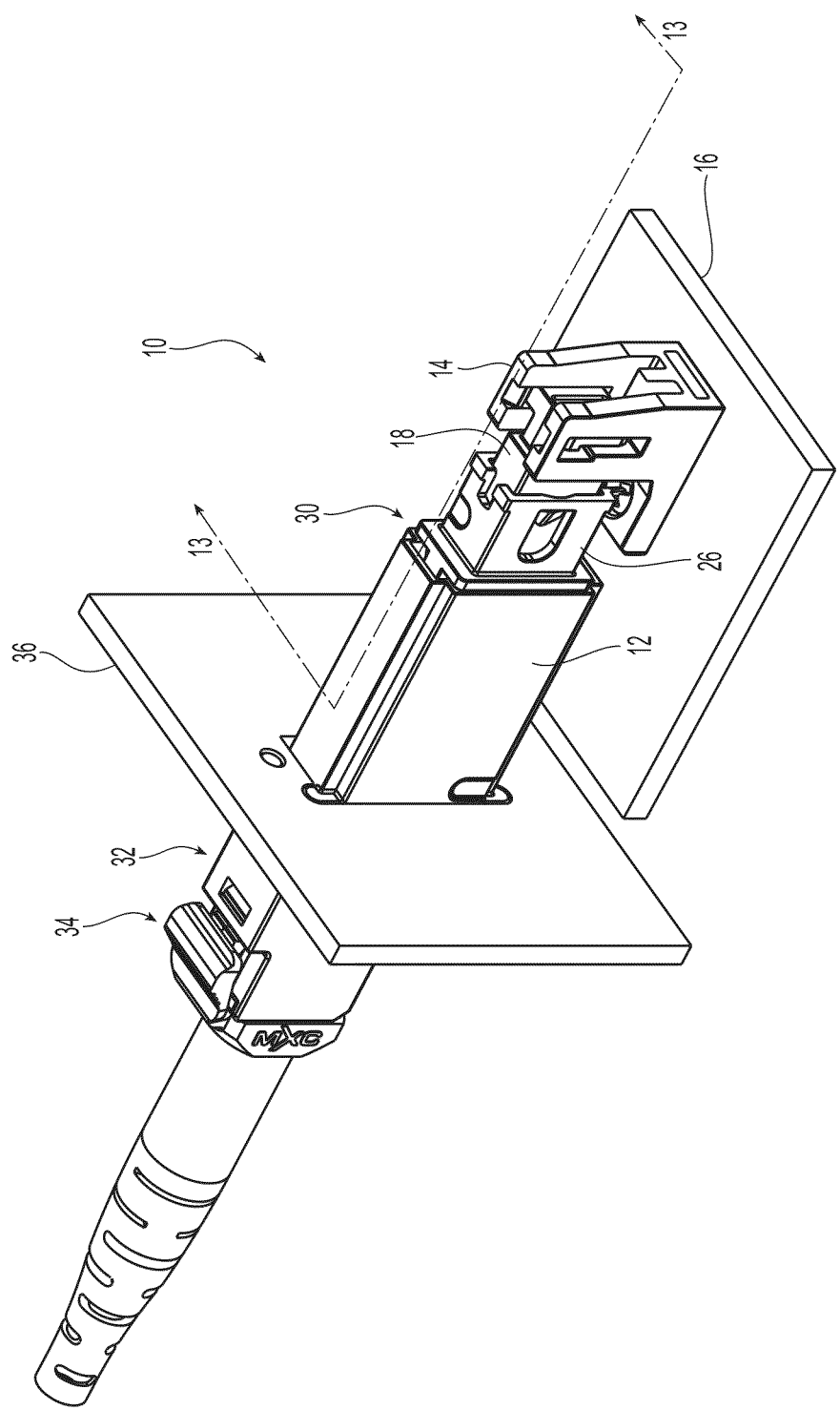
FIG. 1 is a rear left side perspective view of one embodiment of a fiber optic connector assembly and backplane adapter according to the present invention.

Reference will now be made in detail to the present preferred embodiment(s) of the invention, examples of which are illustrated in the accompanying drawings. Whenever possible, the same reference numerals will be used throughout the drawings to refer to the same or like parts.

Figure 2:
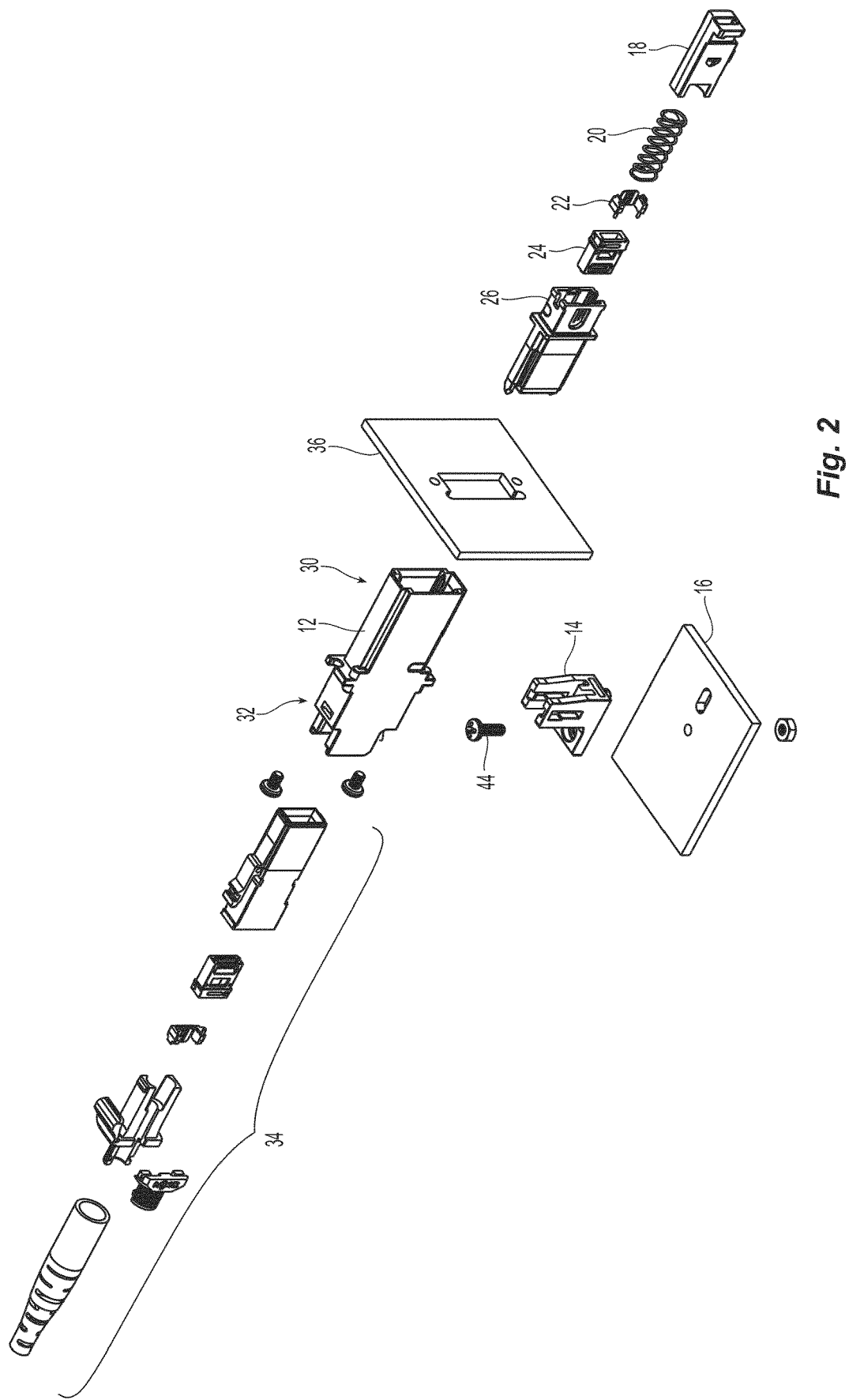
FIG. 2 is an exploded view of the fiber optic connector assembly and backplane adapter of FIG. 1.
Figure 3:
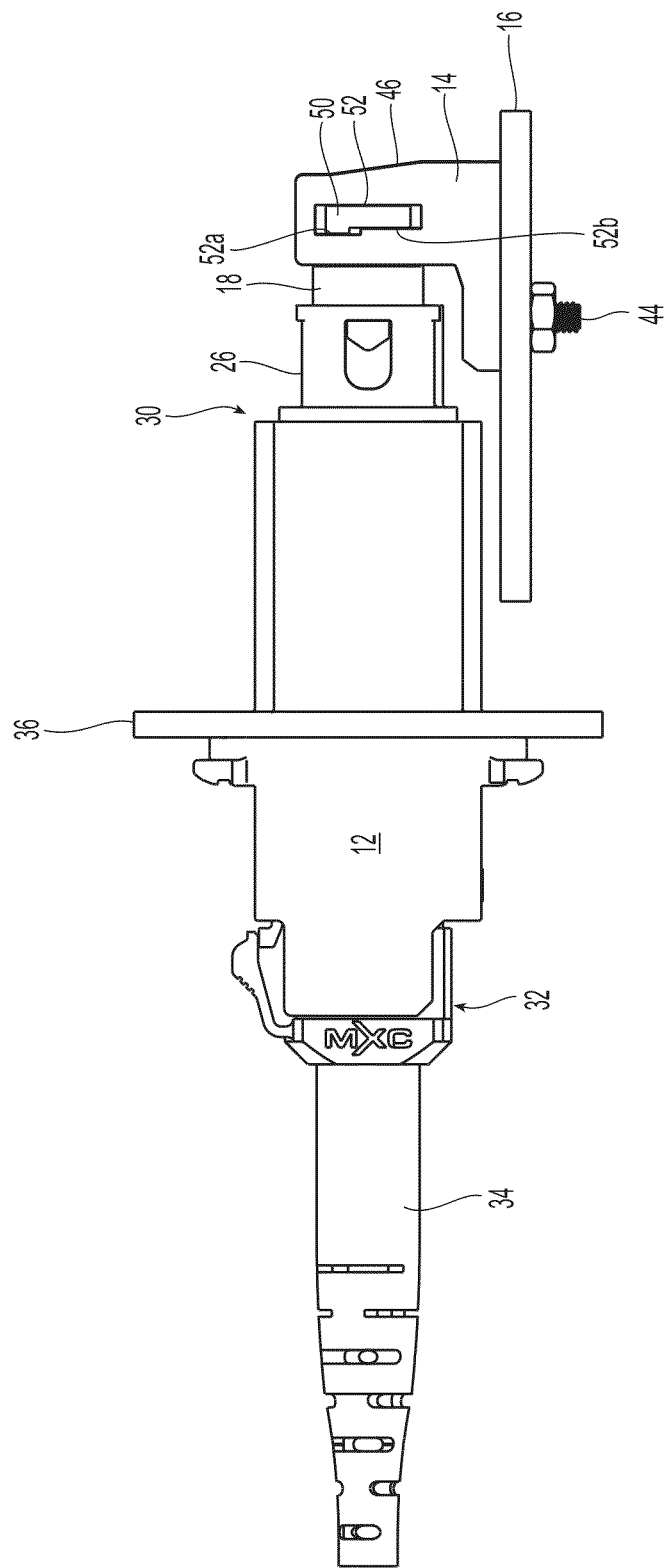
FIG. 3 is a left side elevational view of the fiber optic connector assembly and backplane adapter in FIG. 1.

A first embodiment of a fiber optic connector assembly 10 and backplane adapter 12 are illustrated in FIGS. 1-3. The fiber optic connector assembly 10 includes a bracket 14 that is preferably secured to a portion of a printed circuit board (PCB) 16. The fiber optic connector assembly 10 also includes a spring push 18, a spring 20, a spacer 22, and a fiber optic ferrule 24. See, e.g., FIGS. 13 and 17. The spring push 18, the spring 20, the spacer 22, and the fiber optic ferrule 24 are disposed within at least a portion of a housing 26. The fiber optic connector assembly 10 may also include other components that are typically associated with a fiber optic connector but may not be described here. For example, the fiber optic connector assembly 10 may also include guide pins and a guide pin holder/clamp. One example of a spacer 22 is disclosed in Applicant's U.S. Pat. No. 10,371,903, the contents of which are incorporated herein by reference in their entirety.

The backplane adapter 12 receives at a first end 30 at least a portion of the fiber optic connector assembly 10. At the second end 32, the backplane adapter 12 receives a second outer fiber optic connector 34. In this case, the second outer fiber optic connector 34 is illustrated as an MXC® brand fiber optic connector from the Applicant and is the fiber optic connector to mate with the one attached to the PCB 16, thus being an "outer" fiber optic connector because it outside the server or the computer system. The spring in the outer fiber optic connector 34 is not illustrated for clarity but would be the same as spring 20. However, one of skill in the art would recognize that other configurations of fiber optic connectors could also be used. The second outer fiber optic connector 34 would also have a fiber optic ferrule that would mate with the fiber optic ferrule 24 in the fiber optic connector assembly 10. See FIGS. 13, 17. Also illustrated in FIGS. 1-3 is a portion of a backplane 36, although it does not show the other parts that would normally be associated with a backplane, e.g., circuits, heat sinks, electrical connectors, etc.

Figure 4:
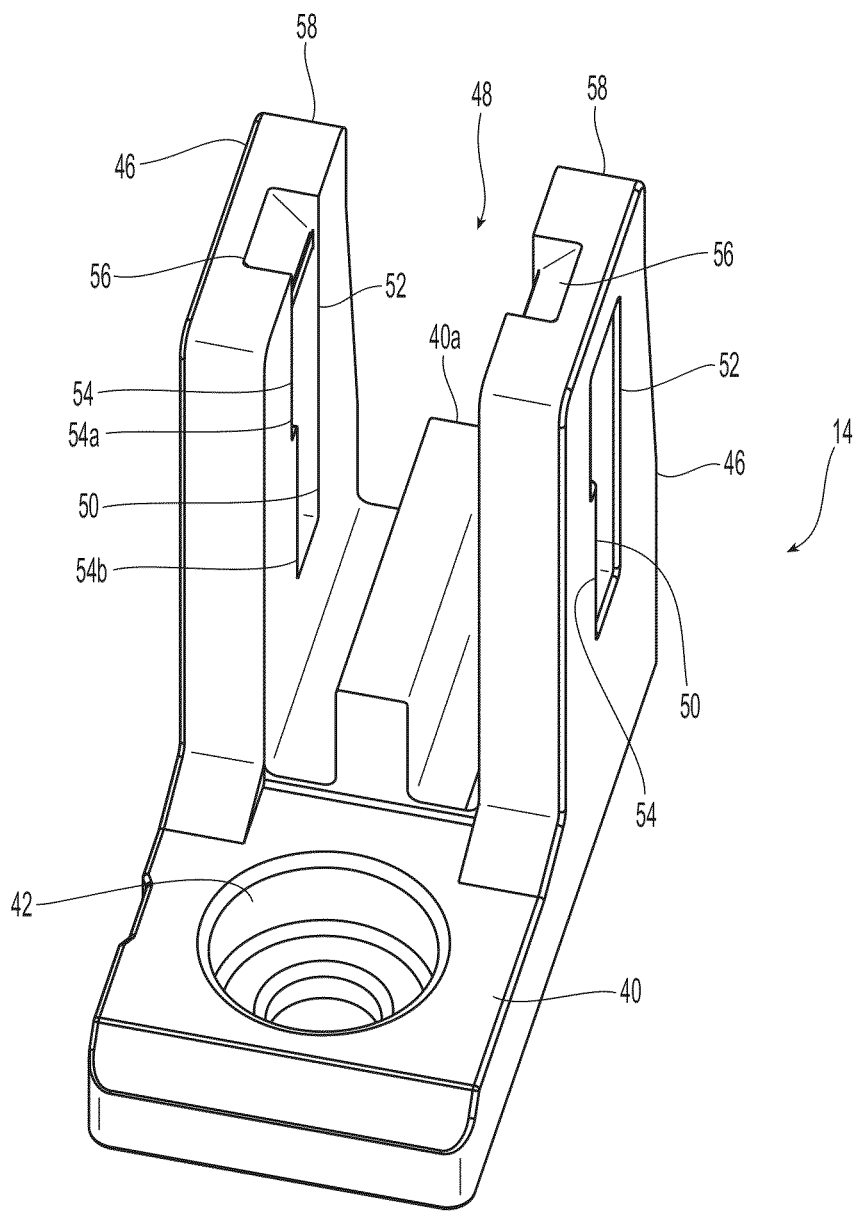
FIG. 4 is a front end perspective view of a bracket from the fiber optic connector assembly in FIG. 1.

The bracket 14 is illustrated in FIG. 4. The bracket 14 has a base 40 with an opening 42 to receive a fastener 44 (see FIG. 3) to secure the bracket 14 to the PCB 16. Extending upward and away from the base 40 are two latch arms 46, the two latch arms 46 and the base 40 forming an opening 48 therebetween. There may also be a base projection 40a extending from the base 40 between the two latch arms 46. The base projection 40a may assist, along with the configuration of the spring push 18, to limit the movement of the spring push 18 and the fiber optic connector assembly 10 in the y-direction (up and down). Each of the latch arms 46 also has a slot 50 to receive a portion of the spring push 18. The slots 50 could pass all the way through the latch arms 46 as shown or they may simply be depressions/indentations in the latch arms 46 from the opening 48 to receive the portion of the spring push 18. The slots 50 have two vertical surfaces 52,54 that form at least a part of the slots 50. The vertical surfaces 52,54 also serve to retain the spring push 18 within the bracket 14 as discussed in detail below. As better illustrated in FIG. 3, the vertical surface 54 may have two different portions 54a and 54b, providing a different width of the slots 50. That is, the slots 50 have a variable width in the mating direction or the z-direction. The latch arms 46 each have a chamfered portion 56 at a top end 58 to receive a portion of the spring push 18 as it is pushed between the latch arms 46 to assist in moving them away from one another (thereby widening the opening 48) to allow a portion of the spring push 18 to be received between the latch arms 46. The slots 50 have a predetermined width (described below in more detail) dictated by the two vertical surfaces 52,54 to prevent the spring push 18 from moving in the z-direction (as noted by the coordinate axis symbol in FIG. 4) when inserted into the bracket 14. The latch arms 46 and the opening 42 could be reversed in relation to one another as well—with the opening 42 further away in the figure.

Figure 5:
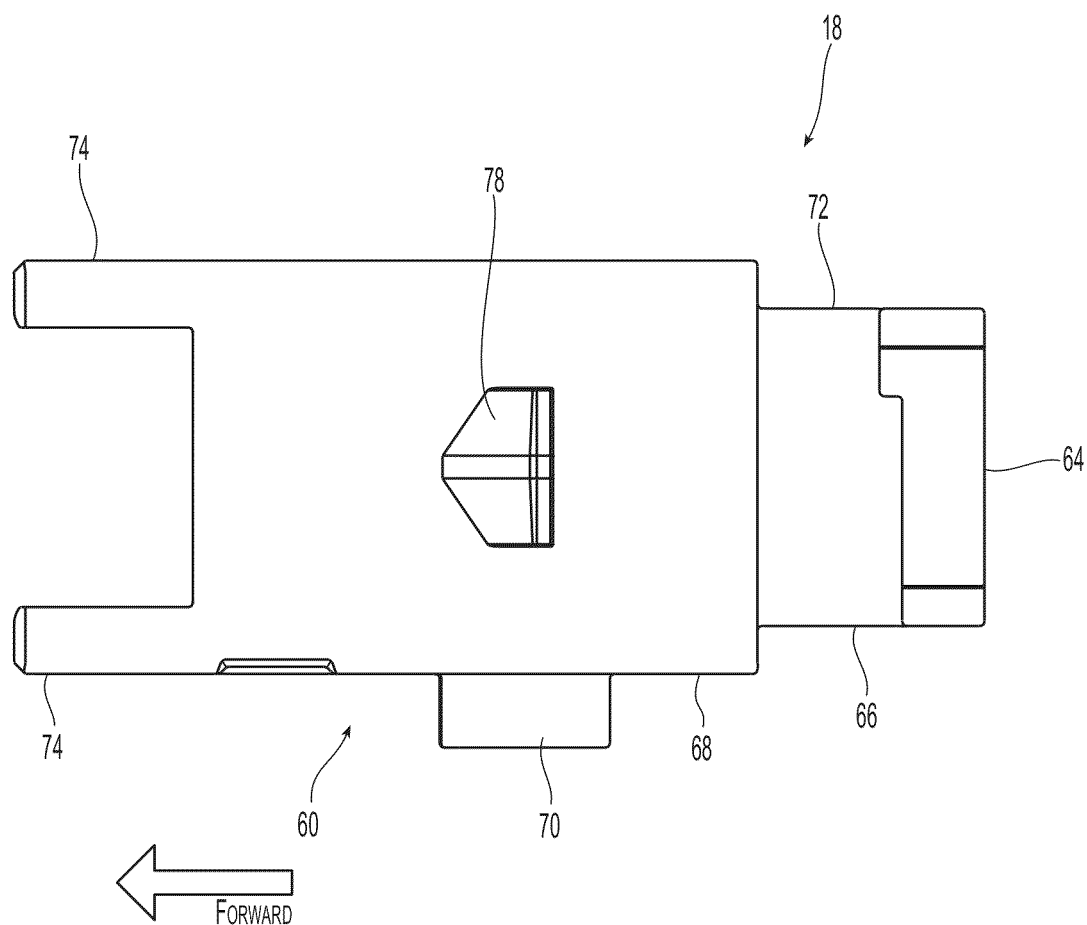
FIG. 5 is a side elevational view of a spring push from the fiber optic connector assembly in FIG. 1.
Figure 6:
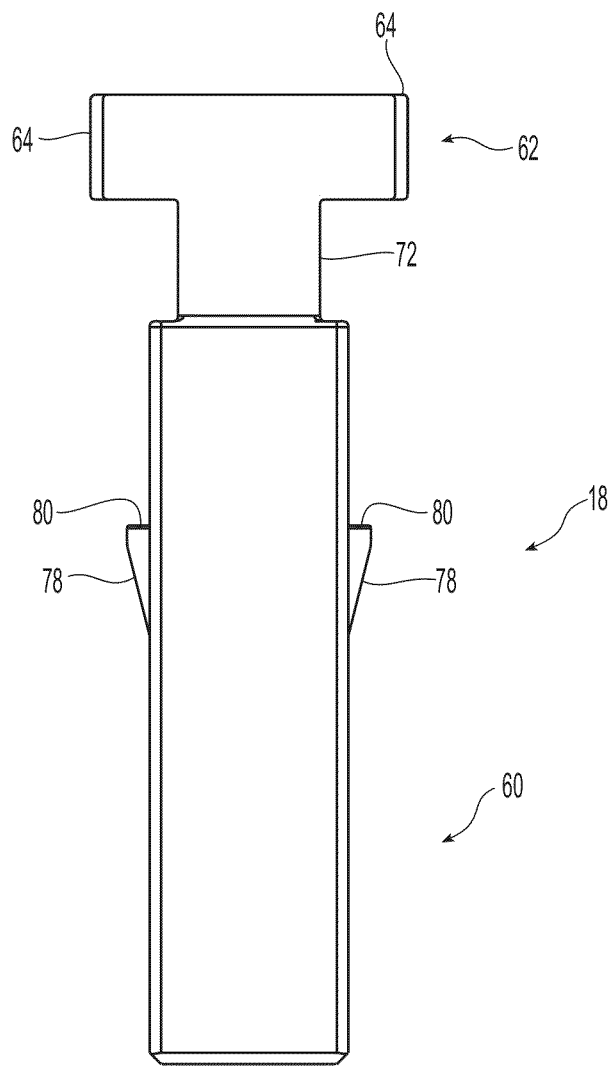
FIG. 6 is a top plan view of the spring push in FIG. 5.

Illustrated in FIGS. 5-7 is the spring push 18 of the fiber optic connector assembly 10. The spring push 18 has a main body 60 and a rearward extending portion 62. See FIG. 6. The rearward extending portion 62 has two flanges 64 that extend in opposing directions from the rearward extending portion 62 to engage the slots 50 in the bracket 14. Additionally, the rearward extending portion 62 has a bottom surface 66 that is disposed above the base projection 40a when it is disposed within the bracket 14. The main body 60 also has a bottom surface 68, which in turn has a key feature 70. The key feature 70 preferably extends downward from the bottom surface 68 of the main body 60 and prevents the spring push 18 from being inserted into the housing 16 in the wrong orientation. Additionally, the rearward extending portion 62 has a portion 72 that fits between the latch arms 46 to allow the two flanges 64 to reach the slots 50 without interference from the main body 60.

The main body 60 of the spring push 18 is designed to engage one end of the spring 20. In fact, there are preferably two arms 74 extending forward (in a direction away from the rearward extending portion 62) from the main body 60 to form an opening 76 within which the spring 20 resides. The opening 76 in the main body 60 and between the two arms 74 extends rearwardly through the rearward extending portion 62. See also FIGS. 8 and 17. The opening 76 allows for the optical fibers to be routed through the spring push 18 and to the fiber optic ferrule 24.

Also on the main body 60 of the spring push 18 are two side detents 78 (see FIG. 6) that extend outward and away from the main body 60. The side detents 78 are inserted with the spring push 18 into the housing 30 and prevent the spring push 18 from being expelled out the back of the housing 30 as they engage a portion of the housing 30 as described in detail below. The side detents 78 could take numerous different shapes/configurations and still fall within the scope of the present invention. There is a rearward facing surface 80 on the side detents 78 that actually engages the housing 30 to prevent removal. See FIGS. 6 and 7.

FIGS. 7 and 8 illustrate the engagement of the spring push 18 with the bracket 14. In FIG. 7, the flanges 64 are disposed in the slots 50, where the slots 50 have the same width as the chamfered portion 56. Thus, the spring push 18 does not move (or preferably very little) in the z-direction. It is preferable that there be little movement in z-direction, as a little movement in the z-direction allows the spring push 18 to move in the x and y directions because of a reduction in the restraining of the spring push 18 in the bracket 14. The spring push 18 and the flanges 64 in particular are aligned with the chamfered portion 56 and then pushed into the opening 48, causing the latch arms 46 to flex outwardly allowing the flanges 64 to settle in the slots 50.

As best seen in FIG. 8, there is sufficient space within the slots 50 to allow for movement of the spring push 18 in the y-direction (upward and downward in the figure). Arrow A points to a space between the top of the flange 64 and the top of the slot 50. Arrow B points to a space between the bottom of the flange 64 and the bottom of the slot 50. The spring push 18 can move up and down within the slots 50 to allow the bracket and PCB to move relative to the fiber optic connector assembly 10. Similarly, there is sufficient space between the side of the spring push 18 and the latch arm 46 to allow relative movement in the x-direction—in the plane of the page—side-to-side. As illustrated in the left side of FIG. 8, the arrow C points to a space between the latch arm 46 and the portion 72 that allows for this movement. The relative movement also helps to alleviate the stress on the PCB 16 as noted above.

The housing 26 is illustrated in FIGS. 9-12 and 15. The housing 26 is preferably a rectangular body 82 with a top 84, a bottom 86 and two side walls 88. As noted, the top 84 and bottom 86 are the smaller sides, with the side walls 88 as being greater to form the rectangular body 80. Depending on the orientation of the backplane adapter 12 and the connectors, the relative sizes of the components of the housing 26 could also change with the top and bottom being greater. On the top 84 and bottom 86 of the housing 26 are alignment features that assist in aligning the fiber optic connector assembly 10 with the backplane adapter 12. One of the alignment features is a coarse alignment arm 90 on the top 84 and bottom 86 of the housing 26. The coarse alignment arm 90 extends beyond a front end 92 of the rectangular body 82 to engage the backplane adapter 12 before the remainder of the housing 26 and the fiber optic ferrule 24 to protect it from improper contact with the backplane adapter 12.

Figure 9:
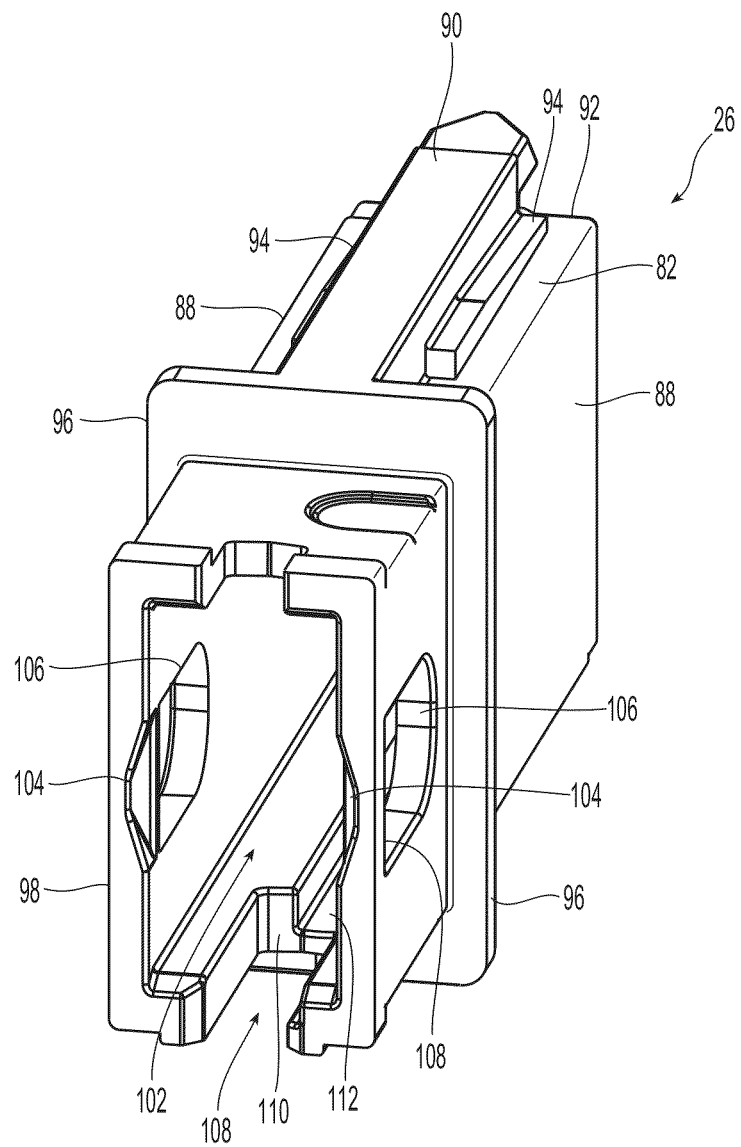
FIG. 9 is a rear perspective view of the housing from the fiber optic connector assembly in FIG. 1.
Figure 10:
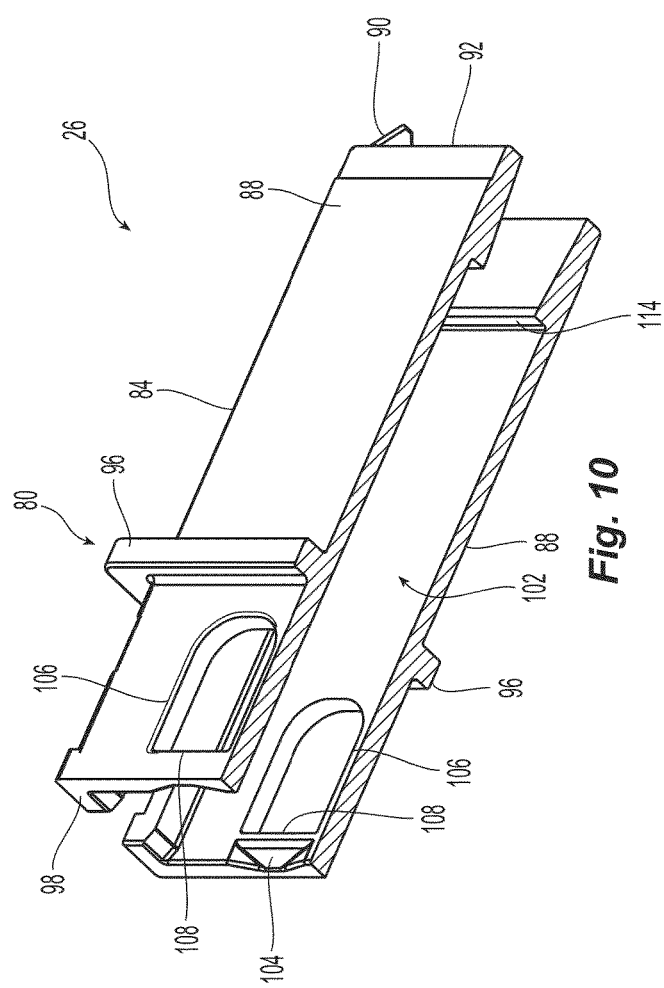
FIG. 10 is a perspective view of a cross section of the housing in FIG. 9 from the underside.
Figure 11:
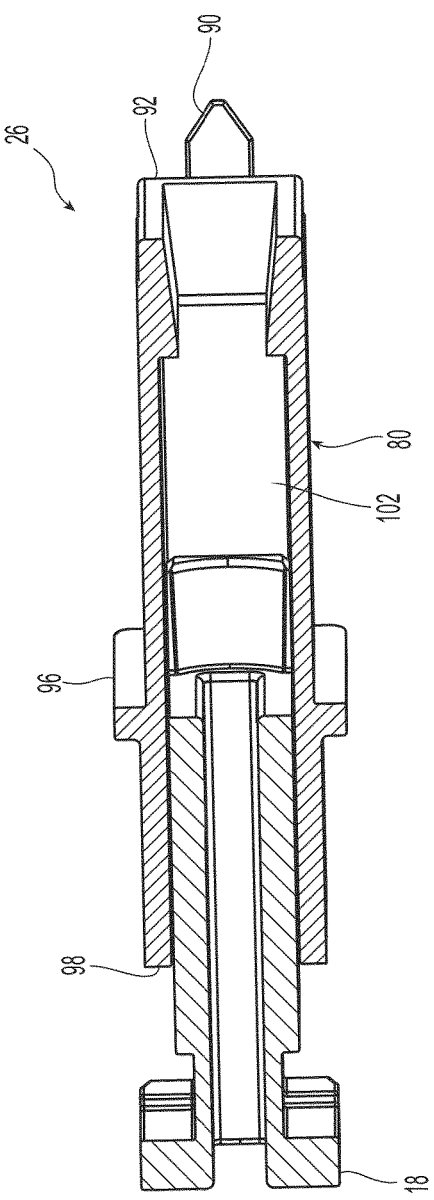
FIG. 11 is side elevational view of a cross section of the housing and the spring push.
Figure 12:
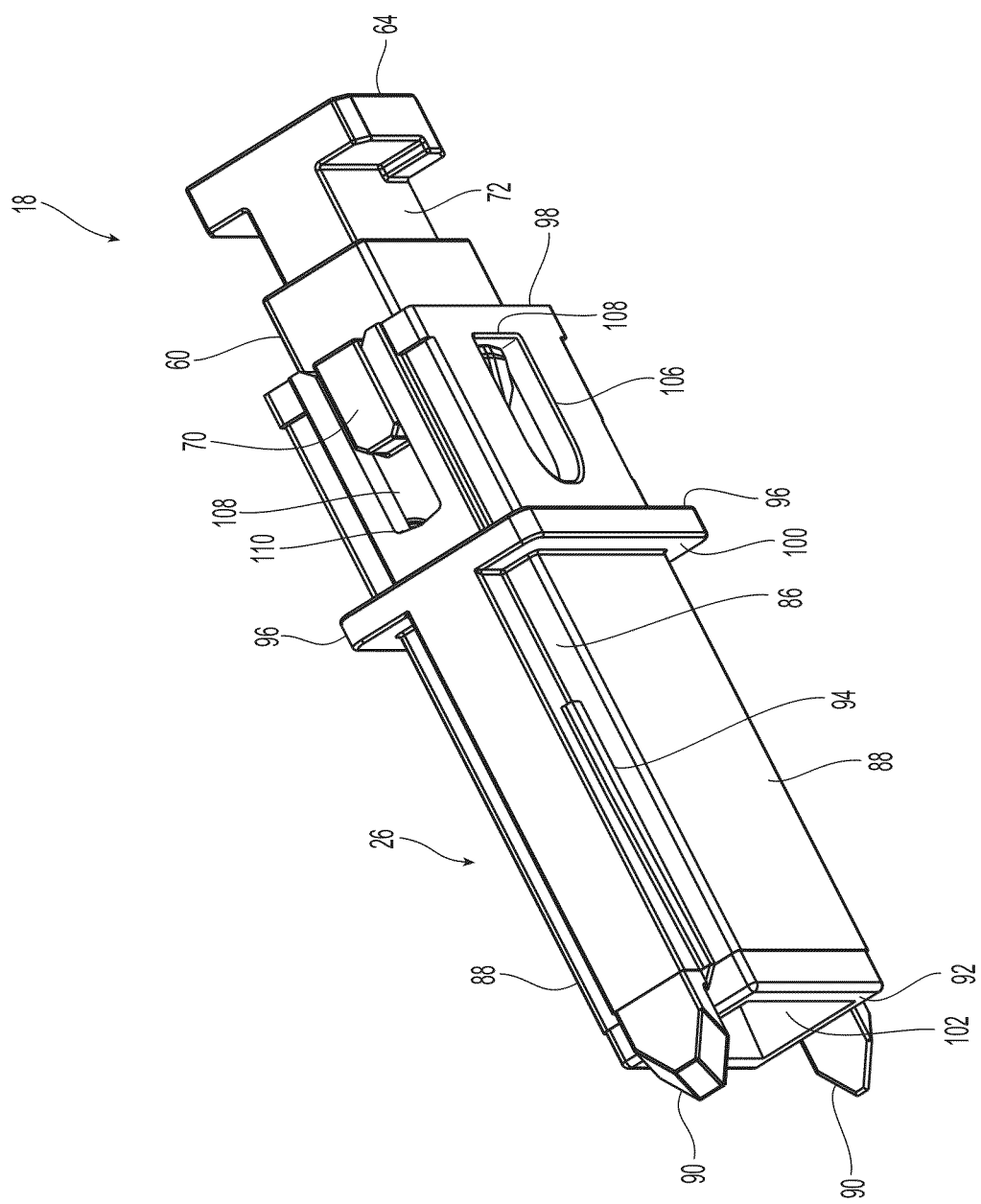
FIG. 12 is bottom perspective view of the housing and the spring push in FIG. 11.

The housing 26 also has as a second alignment feature alignment steps 94 on either side of both of the coarse alignment arms 90 to provide further alignment with the backplane adapter 12. Once the coarse alignment arms 90 have provided the rough alignment of the housing 26 to the backplane adapter 12, the alignment steps 94 then provide further alignment in conjunction with features in the backplane adapter 12 as discussed below. The alignment steps 94 are illustrated in FIGS. 9 and 12 as having an elongate form extending down the coarse alignment arms 90 and a generally square cross section. However, other shapes/configurations are possible and still fall within the inventive concept.

The housing 26 also has a stop portion 96 that will engage a rear surface/outer stop surface on the backplane adapter 12 to prevent the housing from being inserted too far into the backplane adapter 12. The stop portion 96 is positioned on the outside of the rectangular body 82 closer to the front end 92 than the back end 98. As illustrated, the stop portion 96 is a radially extending, circumferential projection that has a flat front surface 100 that engages the backplane adapter 12. See FIG. 12.

The rectangular body 82 has an opening 102 extending between the front end 92 and the back end 98 to receive the spring push 18, the spring 20, the spacer 22, and the fiber optic ferrule 24. However, depending on the connector type used in conjunction with the fiber optic connector assembly, there may be more or fewer parts that are disposed within the opening 102. The back end 98 of the rectangular body 82 preferably has two chamfered portions 104 that cooperate with the two side detents 78 on the spring push 18 to allow the spring push 18 to be inserted into the opening 102. The two side walls 88 each have a window 106 close to the back end 98 to receive one of the two side detents 78. While the windows 106 are illustrated as being complete openings in the side walls 88, there may be a portion of the side walls 88 that at least partially covers the windows 106, thereby making them into more of a depression or recessed area. The windows 106 are sized to be larger than the side detents 78 to allow for movement of the spring push 18 relative to the housing 26 in the z-direction (in and out of the opening 102), while retaining the spring push 18 within the housing 26. That is, the spring push 18 can move from one position to another within the housing 26, with no movement in the z-direction relative to the PCB 16 or the bracket 14. The windows 106 have a rear surface 108 that faces the front end 92 and will engage the rearward facing surface 80 on the side detents 78. The length of the windows, from the rear surface 108 towards the front end 92 is longer than the distance that the spring push 18 can be inserted into the housing 26, thereby allowing free movement of the side detents 78 in the windows 106.

The housing 26 also has in the bottom 86 a keyway 108. The keyway 108 receives the key 70 on the spring push 18. If the housing 26 is not oriented correctly with respect to the spring push 18, the key 70 will prevent the spring push 18 from fitting within the opening 102. At the end of the keyway 108 is a key stop surface 110. The key stop surface 110 is provided to ensure that the housing 26 is not pushed too far into the backplane adapter 12. Similarly, there is a spacer key slot 112 that extends along a length of the bottom 86 to receive a key on the spacer 22. One example of a spacer is described in U.S. Pat. No. 10,371,903, which is assigned to the applicant of this application, and the contents of this patent are incorporated herein in their entirety. It should be noted that the spacer 22 with a key on one side may also act as a secondary key in this fiber optic connector assembly 10.

The housing 26 also has a fiber optic ferrule stop 114 that engages the shoulder on the fiber optic ferrule 24. The fiber optic ferrule stop 114, see FIGS. 10 and 17, prevents the fiber optic ferrule 24 from being pushed out the front end 92 of the housing 26. The spring 22 and the positions of the spring push 18 and the housing 26 keep sufficient force against the back of the fiber optic ferrule 24 to keep it engaged with the fiber optic ferrule stop 114.

Figure 13:
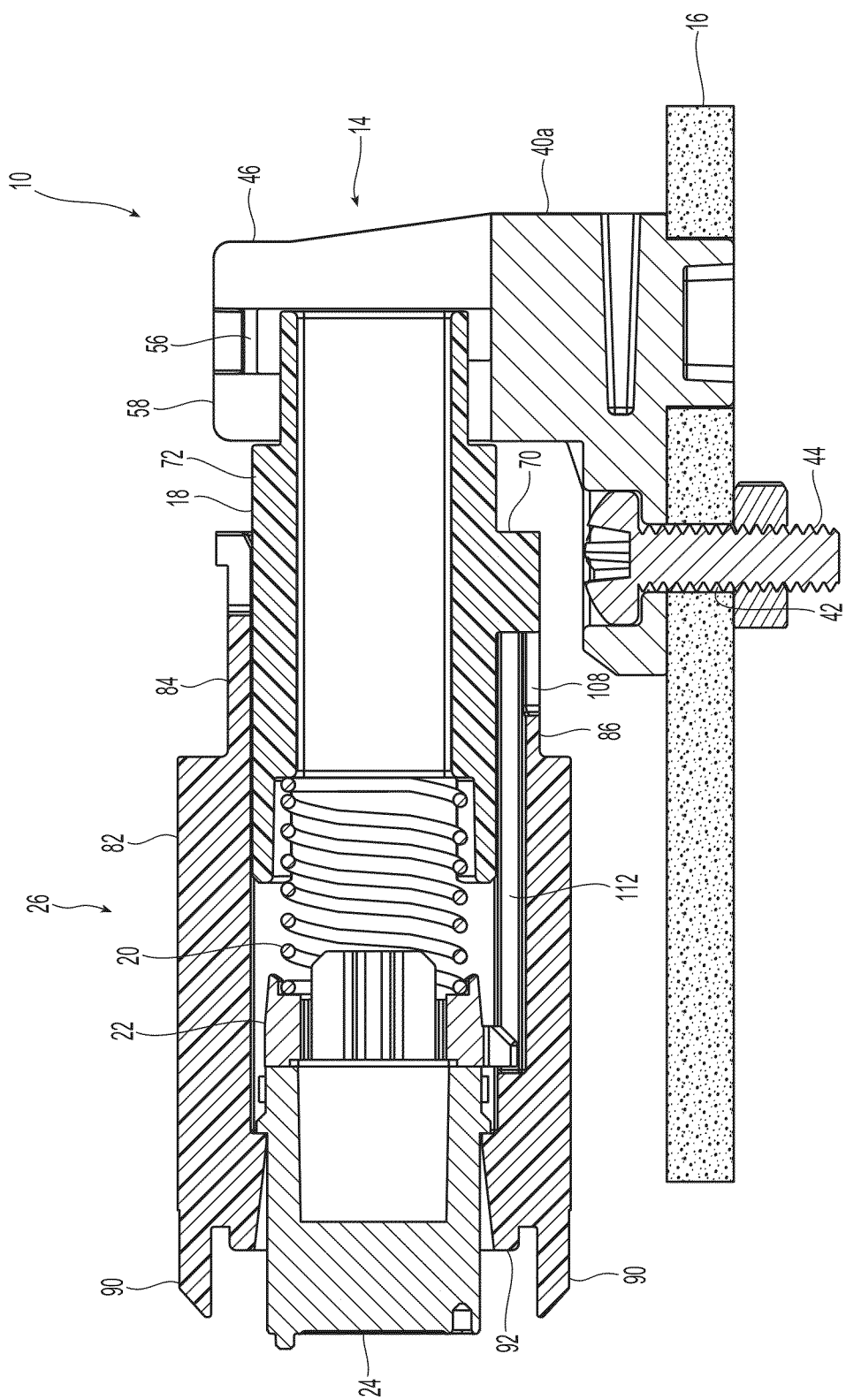
FIG. 13 is a left side perspective view of a cross section of the fiber optic connector assembly connected to the bracket along the lines 13-13 in FIG. 1.

FIG. 13 illustrates the fiber optic connector assembly 10 ready to be inserted into the backplane adapter 12. As noted above, the movement of the fiber optic connector assembly 10 is handled by the connection between the bracket 14 and the spring push 18 for the x and y-directions and the movement in the z-direction is handled by the movement of the spring push 18 within the housing 26.

Figure 14:
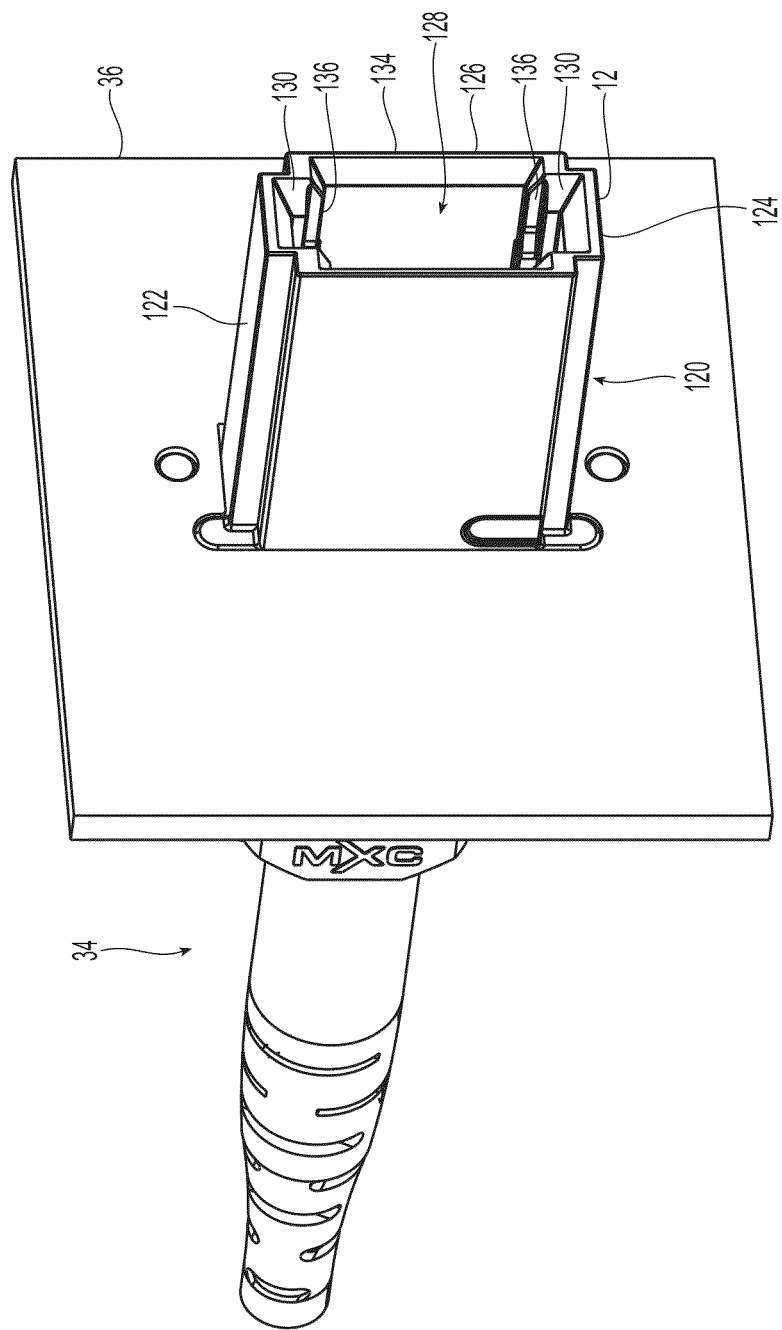
FIG. 14 is a front perspective view of one embodiment of a backplane adapter inserted into a portion of a backplane.
Figure 16:
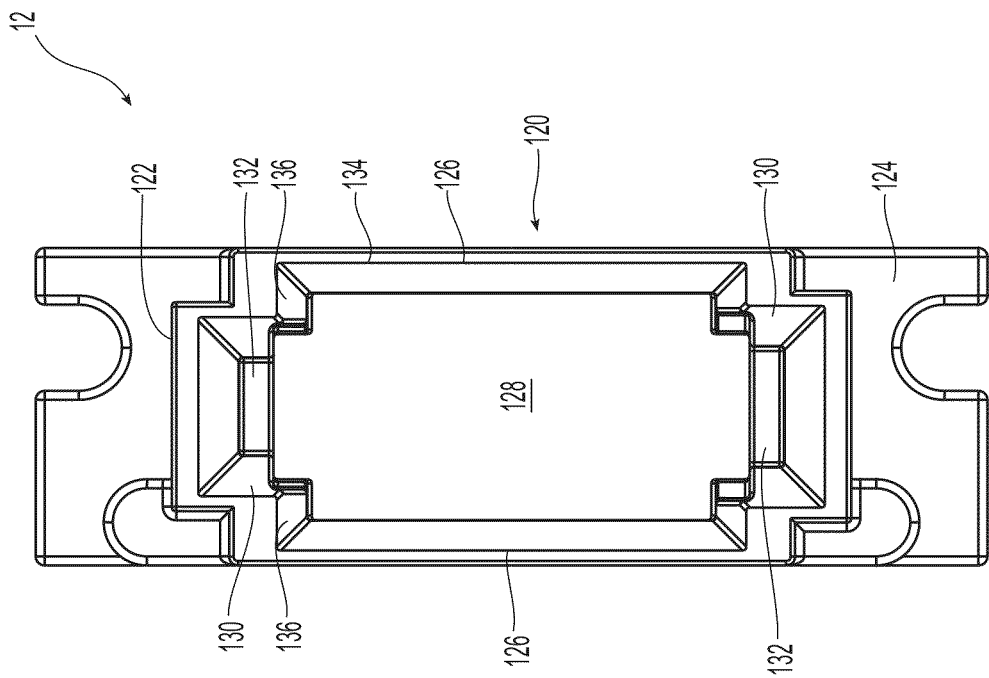
FIG. 16 is a front elevational view of the front end of the backplane adapter.
Figure 15:
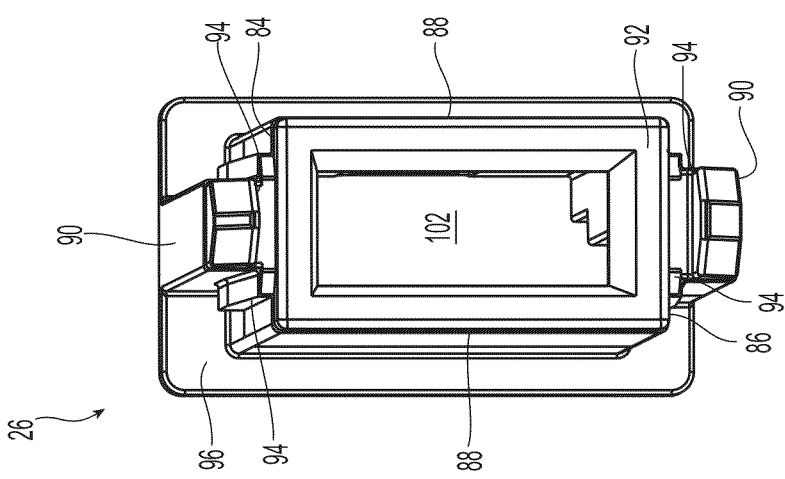
FIG. 15 is front end perspective view of the housing from the fiber optic connector assembly.

Turing to FIGS. 14-16, where the backplane adapter 12 is discussed along side a front view of the housing 26. FIG. 14 illustrates the backplane adapter 12 inserted into the backplane 36 with the second outer fiber optic connector 34 also inserted into the second end 32. The backplane adapter 12 also has a rectangular body 120 with a top 122, a bottom 124 and two side walls 126, which corresponds to the configuration of the housing 26 for clear reasons. The rectangular body 120 has an opening 128 to receive the housing 26 therein. Adjacent the top 122 and bottom 124 are alignment arm passageways 130 to receive the coarse alignment arms 90 on the housing 26. At the ends of the alignment arm passageways 130 are alignment arm stops 132, which generally are not used. The reason that the alignment arm stops 132 are not used is that the stop portion 96 on the housing 26 will engage a rear surface/outer stop 134 on the backplane adapter 12. The distance from the end of the coarse alignment arm 90 to the stop portion 96 on the housing 26 is less than the length of the alignment arm passageways 130. Thus, the end of the coarse alignment arm 90 never gets to the alignment arm stops 132. However, there must be an end to the alignment arm passageways 130. The backplane adapter 12 also has in the opening 128 alignment step passageways 136 to receive the alignment steps 94. As noted briefly above, the combination of the alignment step passageways 136 and the alignment steps 94 more accurately places the fiber optic ferrule 23 within the backplane adapter 12 to align with the fiber optic ferrule in the second outer fiber optic connector 34. The two components, the housing 26 and the backplane adapter 12, have been placed side-by-side in FIGS. 15 and 16 to allow for the explaining of matching of the corresponding components.

Figure 17:
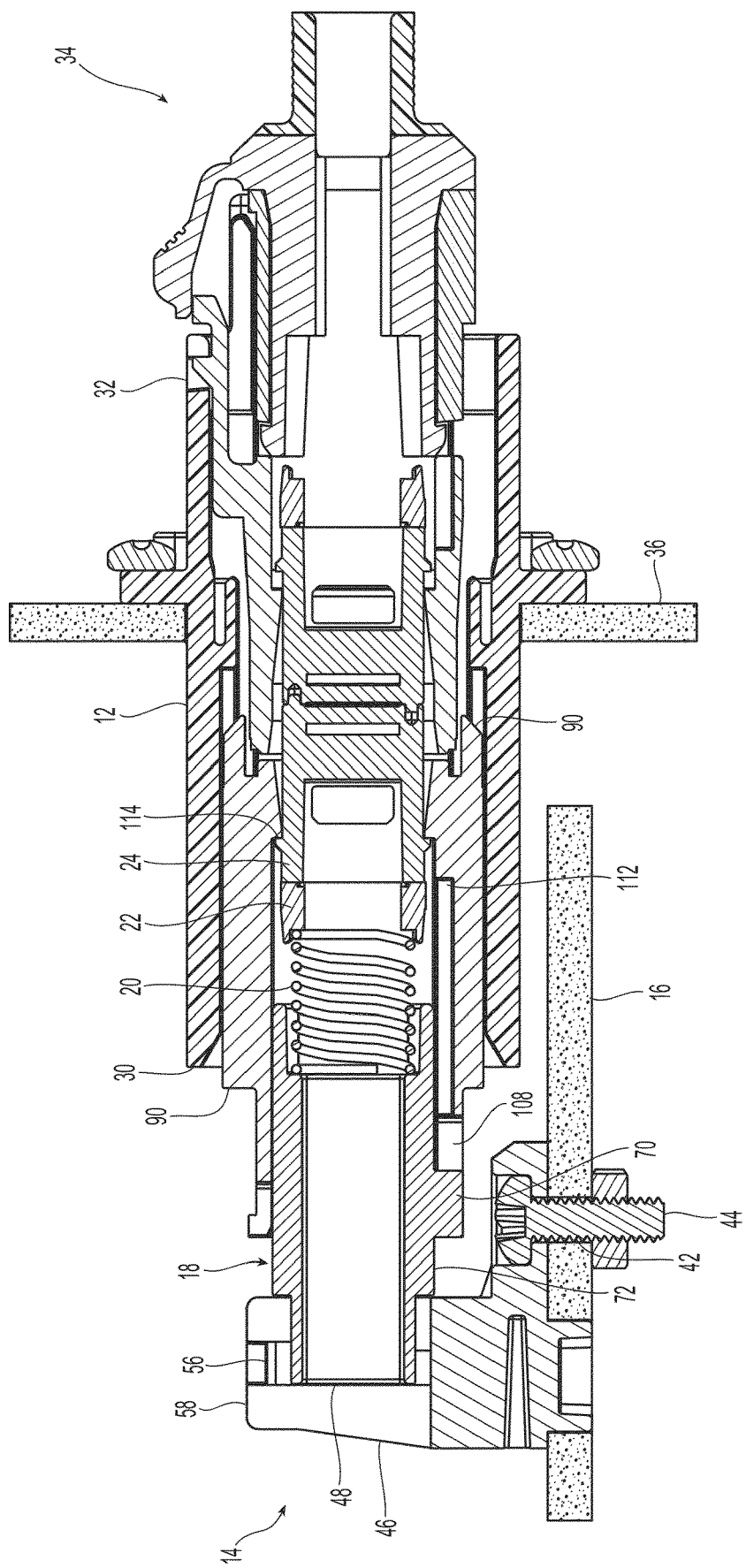
FIG. 17 is a right side perspective view of the fiber-optic connector of assembly inserted into and engaging and an outer connector inserted into the backplane adapter.
Figure 18:
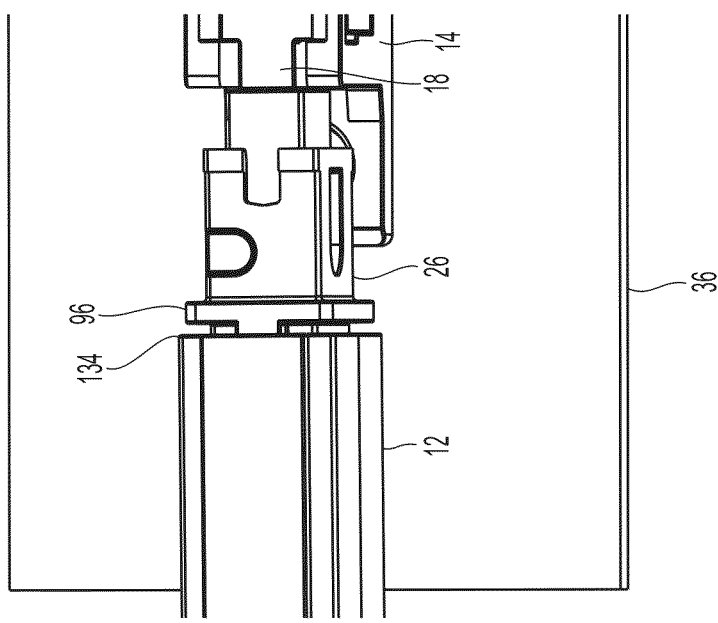
FIG. 18 is a top perspective view of the fiber-optic connector assembly inserted into the backplane adapter.

FIG. 17 illustrates the assembled fiber optic connector assembly 10 and the backplane adapter 12. FIG. 18 illustrates from the top, the fiber optic connector assembly with the housing 26 almost completely within the backplane adapter 12. As can be seen, the stop portion 96 on the housing 26 is almost completely within the backplane adapter 12 and almost touching the ear surface/outer stop 134 on the backplane adapter 12. It then only needs to be moved forward slightly to finalize the assembly and mate with the fiber optic connector 34. In this respect, once fully assembled, the fiber optic connector assembly 10 with the spring push 18, the housing 26, and the ferrule 24 acts as a card side connector that can be used as a single connector port or as multiple connector ports when many such components are provided side-by-side, giving flexibility to the overall design. Further, the assembly can be dismantled easily by flaring out the latch arms 46 and pulling out the spring push 18 from the bracket 14. Subsequently, the housing 26 can be gently pulled away from the backplane adapter 12 to remove the connection with the fiber optic connector 34.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A system for mating fiber optic connectors, comprising:
   a backplane; and
   at least one backplane adapter coupled to the backplane at a cutout of the backplane, the at least one backplane adapter comprising:
   a main body having a top and a bottom separated by two opposite side walls to define an opening in the main body and positioned such that a portion of the main body is on a first side of the backplane and another portion of the main body is on a second side of the backplane, and
   an alignment passageway within the main body of the backplane adapter to receive an alignment feature on a fiber optic connector housing of a fiber optic connector operably coupled to a printed circuit board also on the first side of the backplane, the alignment passageway having a length that is longer than a length of the alignment feature, a stop portion of the fiber optic connector housing engageable with an outer stop surface before a front end of the alignment feature engages an internal portion of the backplane adapter during an insertion of the fiber optic connector housing into the opening,
   wherein the alignment passageway has a different width on the top than on the bottom inside the opening.

2. The system of claim 1, further comprising a printed circuit board on the first side of the backplane.

3. The system of claim 2, further comprising:
   a bracket securable to the printed circuit board, the bracket having flexible latch arms defining an opening of the bracket between the flexible latch arms.

4. The system of claim 3, further comprising:
   a spring push operably connected to at least a portion of the bracket and disposed within a portion of the opening of the bracket, the spring push being moveable in two orthogonal, non-mating directions within the bracket; and
   a housing having a slot for receiving and retaining the spring push.

5. The system of claim 4, further comprising:
   a fiber optic ferrule disposed in at least a portion of the housing.

6. The system of claim 4, wherein each of the orthogonal, non-mating directions is orthogonal to a mating direction.

7. The system of claim 4, wherein the spring push is configured to be slidably received and slidably retained in the slot.

8. The system of claim 4, wherein the spring push is movable from a first position within the housing to a second position when a force is exerted on the printed circuit board.

9. The system of claim 4, wherein the flexible latch arms include a slot to receive and retain the spring push.

10. The system of claim 4, further comprising a fiber optic ferrule biased against a fiber optic ferrule stop surface in a housing opening even when engaged with another fiber optic ferrule received in the at least one backplane adapter from the second side.

11. The system of claim 1, wherein the backplane is of a server or a computer system.

12. A combination of a backplane adapter and a fiber optic connector assembly, comprising:
    a fiber optic connector assembly comprising:
    a bracket securable to a printed circuit board, the bracket having latch arms defining an opening therebetween,
    a spring push disposed within a portion of the opening, wherein each of the latch arms has a slot to receive a portion of the spring push, the spring push being moveable in two orthogonal, non-mating directions within the bracket, and a housing having a slot for slidably receiving and retaining the spring push; and a backplane adapter comprising:

a main body with an outer stop surface configured to engage a stop portion of a fiber optic connector housing, and an alignment passageway within the main body of the backplane adapter to receive an alignment feature on the fiber optic connector housing.

13. The combination of claim 12, wherein the alignment passageway has a length that is longer than a length of the alignment feature, the stop portion of the fiber optic connector housing engaging the outer stop surface before a front end of the alignment feature engages an internal portion of the backplane adapter.

14. The combination of claim 12, wherein the backplane adapter further comprises at least one alignment step passageway to receive at least one alignment step on the fiber optic connector housing.

15. The combination of claim 12, wherein the backplane adapter is free of any latching mechanism to receive the fiber optic connector housing.

16. A backplane having the backplane adapter according to claim 12, and further comprising an at least one additional backplane adapter identical to the backplane adapter.

17. The combination of claim 12, wherein the backplane adapter is engageable with a backplane at a cutout of the backplane.

18. The combination of claim 17, wherein a portion of the main body of the backplane adapter is on a first side of the cutout and another portion of the main body is on a second side of the cutout in the backplane.

19. The combination of claim 12, wherein the fiber optic connector assembly further comprises a fiber optic ferrule.

20. The combination of claim 12, wherein the spring push is movable from a first position within the housing to a second position when a force is exerted on the printed circuit board.

* * * * *